(12) United States Patent
Hu et al.

(10) Patent No.: US 12,501,113 B1
(45) Date of Patent: Dec. 16, 2025

(54) TARGETED INTERVENTIONS VIA LONG TERM REWARD ATTRIBUTION IN COMPLEX SOFTWARE ECOSYSTEMS

(71) Applicant: INTUIT INC., Mountain View, CA (US)

(72) Inventors: Zhao Hu, Fremont, CA (US); Nan Jiang, Mountain View, CA (US); Shankar Sankararaman, Fremont, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/223,445

(22) Filed: May 30, 2025

(51) Int. Cl.
H04N 21/466 (2011.01)
G06N 20/00 (2019.01)
G16H 20/70 (2018.01)

(52) U.S. Cl.
CPC ......... H04N 21/4667 (2013.01); G06N 20/00 (2019.01); G16H 20/70 (2018.01); H04N 21/4662 (2013.01)

(58) Field of Classification Search
CPC .............................................. H04N 21/4662
See application file for complete search history.

(56) References Cited

U.S. PATENT DOCUMENTS 11,625,796 B1 * 4/2023 Xia ................. G06Q 30/0202
705/14.46
2021/0035163 A1 * 2/2021 Peris ................. G06Q 30/0243

* cited by examiner

Primary Examiner — Michael H Hong
(74) Attorney, Agent, or Firm — Patterson + Sheridan, LLP (57) ABSTRACT

Aspects of the present disclosure provide techniques for dynamic reward-driven intervention in a software application. Embodiments include determining rewards associated with user actions in the software application using a reward machine learning model trained based on prior instances of the user actions associated with values for a target attribute, each of the prior instances of the user actions being performed within a particular time interval following a prior intervention provided via the software application. Embodiments include providing interventions to a user via the software application. Embodiments include detecting that the user has performed one or more respective user actions of the user actions after the providing of each intervention of the interventions. Embodiments include training an intervention machine learning model based on the detecting and the rewards. Embodiments include providing a targeted intervention to the user via the software application based on the training of the intervention machine learning model.

20 Claims, 6 Drawing Sheets

TARGETED INTERVENTIONS VIA LONG TERM REWARD ATTRIBUTION IN COMPLEX SOFTWARE ECOSYSTEMS

INTRODUCTION

Aspects of the present disclosure relate to techniques for dynamically generating targeted interventions to provide to users of software applications using machine learning techniques that assign rewards to interim actions based on learned connections between the interim actions and long term target attributes.

BACKGROUND

Every year millions of people, businesses, and organizations around the world utilize software applications to assist with countless aspects of life. Many software applications provide automated interventions to users, such as to suggest actions, provide relevant content, present offers, initiate support sessions, and/or the like.

Many existing automated intervention techniques require machine learning models that have been trained on extensive amounts of training data applicable to a specific user for whom interventions are automatically selected and including ground truth data about particular target attributes. For example, training data may show that a user has previously responded favorably (e.g., as measured via the target attribute, such as a revenue amount or the like) to particular types of interventions. The training data must generally be user-specific in order to account for the unique preferences and behavior patterns of each user, and must generally include ground truth for target attributes that take a significant amount of time to detect after proving a particular intervention. Examples of techniques trained on such training data include the Temporal-Contextual Recommendation in Real-Time system from Amazon® and the Recommender System from Netflix®. However, obtaining the training data required for such techniques (e.g., including values for a long-term target attribute in order to establish a direct link between an intervention and a change event for the target attribute), particularly at the individual user level, is challenging, time-consuming, and resource intensive. This problem is exacerbated in complex software ecosystems, where it is particularly challenging to attribute long-term changes in target attributes (e.g., revenue) to specific interventions due to the large variety of other potential contributing factors related to the application (e.g., the correspondence between an intervention and a change in a target attribute value may be unclear).

Accordingly, there is a need in the art for improved techniques of generating targeted interventions in software applications.

BRIEF SUMMARY

Certain embodiments provide a method for dynamic reward-driven intervention in a software application. The method generally includes: determining rewards associated with user actions in the software application using a reward machine learning model trained based on prior instances of the user actions associated with values for a target attribute, wherein each of the prior instances of the user actions was performed within a particular time interval following a prior intervention provided via the software application; providing interventions to a user via the software application; detecting that the user has performed one or more respective user actions of the user actions after the providing of each intervention of the interventions; training an intervention machine learning model based on the detecting and the rewards; and providing a targeted intervention to the user via the software application based on the training of the intervention machine learning model.

Other embodiments comprise systems configured to perform the method set forth above as well as non-transitory computer-readable storage mediums comprising instructions for performing the method set forth above.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable mediums for dynamic reward-driven intervention in a software application.

Software applications may provide automated interventions to users, such as presenting content, initiating support sessions, suggesting actions to perform, providing communication or offers, and/or the like. Some existing applications, such as the Temporal-Contextual Recommendation in Real-Time system from Amazon® and the Recommender System from Netflix®, use machine learning to automatically select interventions to provide to a user, such as using a model trained on data indicating which particular interventions previously resulted in a positive change for a target attribute (e.g., revenue, subscriptions, and/or the like) for the user or for similar users. However, obtaining training data for use in training such a model can be challenging, time consuming, and resource intensive. The effects of particular interventions on certain target attributes often takes a significant amount of time to track, and doing so for individual users (in order to account for the particular preferences and behavior patterns of each user in training data) is often prohibitively time consuming.

While it may be possible to apply training data gathered for one user to another similar user (e.g., based on some technique of determining user similarity), such techniques may not produce optimal results due to the unique nature of each individual user. For example, just because one user that works as an accountant ultimately purchases one or more products in response to an automatically initiated chat session, this does not necessarily mean that a different user that also works as an accountant will respond similarly to an automatically initiated chat session. Thus, it is technically difficult to train a machine learning model to predict interventions that are likely to have a beneficial outcome in terms of a particular target attribute for a particular user. This technical challenge is particularly acute in complex software ecosystems, where a variety of other potential contributing factors may obscure the connections between interventions and changes in target attribute values.

Embodiments of the present disclosure overcome these challenges through a reward-driven machine learning process in which rewards are dynamically assigned to intermediate actions based on learned connections between the intermediate actions and one or more target attributes. For example, a target attribute may be a long-term value such as a revenue value or purchase of a product or service while an intermediate action may be a shorter-term action such as creation of a particular type of document, assigning of a category to an item, activation of an application feature, navigation to a particular page within the software application, and/or the like. As described in more detail below with respect to FIG. 2, a machine learning model (e.g., referred to as a reward model) may be trained based on past associations between certain interventions, certain intermediate actions that followed those interventions, and certain target attribute values that also followed those interventions to assign rewards to the intermediate actions based on their degree of correlation with target attribute values that are considered positive (e.g., high revenue values, purchase of products or services, and/or the like). By contrast, prior techniques do not take into account such intermediate actions that occur after interventions and that are separate from a target attribute.

As described in more detail below with respect to FIG. 3, the rewards automatically assigned to the intermediate actions by the reward model may then be used at the individual user level to train a different machine learning model (e.g., referred to as an intervention model) based on connections between particular interventions and particular intermediate actions for an individual user. The rewards assigned to the intermediate actions may serve in the training process as "proxy" rewards for the (e.g., longer-term) target attribute without the need to actually capture training data for the individual user that includes values for the target attribute.

Thus, training data for the intervention model may be efficiently generated for an individual user and then used to train the intervention model for that user to automatically determine targeted interventions to provide to that user. The intervention model may, by virtue of having been trained in such a manner using such proxy rewards, be able to accurately and efficiently predict interventions to provide to the user that are likely to result in the user performing certain intermediate actions that are historically correlated (e.g., in data from other users) with desirable values for the target attribute. Thus, such predicted interventions may be determined using the intervention model and, as described in more detail below with respect to FIG. 4, may be automatically provided to the user (e.g., within the software application, such as via a user interface) to produce beneficial results.

Techniques described herein improve the technical field of software applications that provide automated interventions in a variety of ways. For instance, by dynamically generating rewards for actions through a machine learning based process based on learned connections between the actions and a target attribute (e.g., based on data from a broader user base), aspects of the present disclosure enable action rewards to be used as proxy rewards for the target attribute for a given user without requiring the generation of training data for the given user that includes values for the target attribute. Thus, aspects of the present disclosure allow training data to be captured for a particular user in a fast and resource-efficient manner (e.g., not requiring tracking of longer-term target attribute values for the particular user) for use in training a machine learning model to generate accurate targeted intervention predictions for that particular user.

By utilizing an action rewards based machine learning technique instead of a target attribute rewards based machine learning technique, aspects of the present disclosure significantly shorten the measurement time for training and reduce the variance of rewards, resulting in higher accuracy intervention predictions that can be used to provide interventions earlier than with prior techniques. In complex software ecosystems it is often not possible to directly track connections between interventions and longer-term target attributes such as revenue due to the large universe of possible contributing factors to such a target attribute. Aspects of the present disclosure overcome this technical challenge by converting long-term rewards that would otherwise be associated with a target attribute to shorter-term rewards that can be efficiently and accurately captured via intermediate actions within a software application without changing the optimized target, resulting in high-accuracy and efficient automated intervention determinations that would not be possible with prior techniques.

Figure 1:
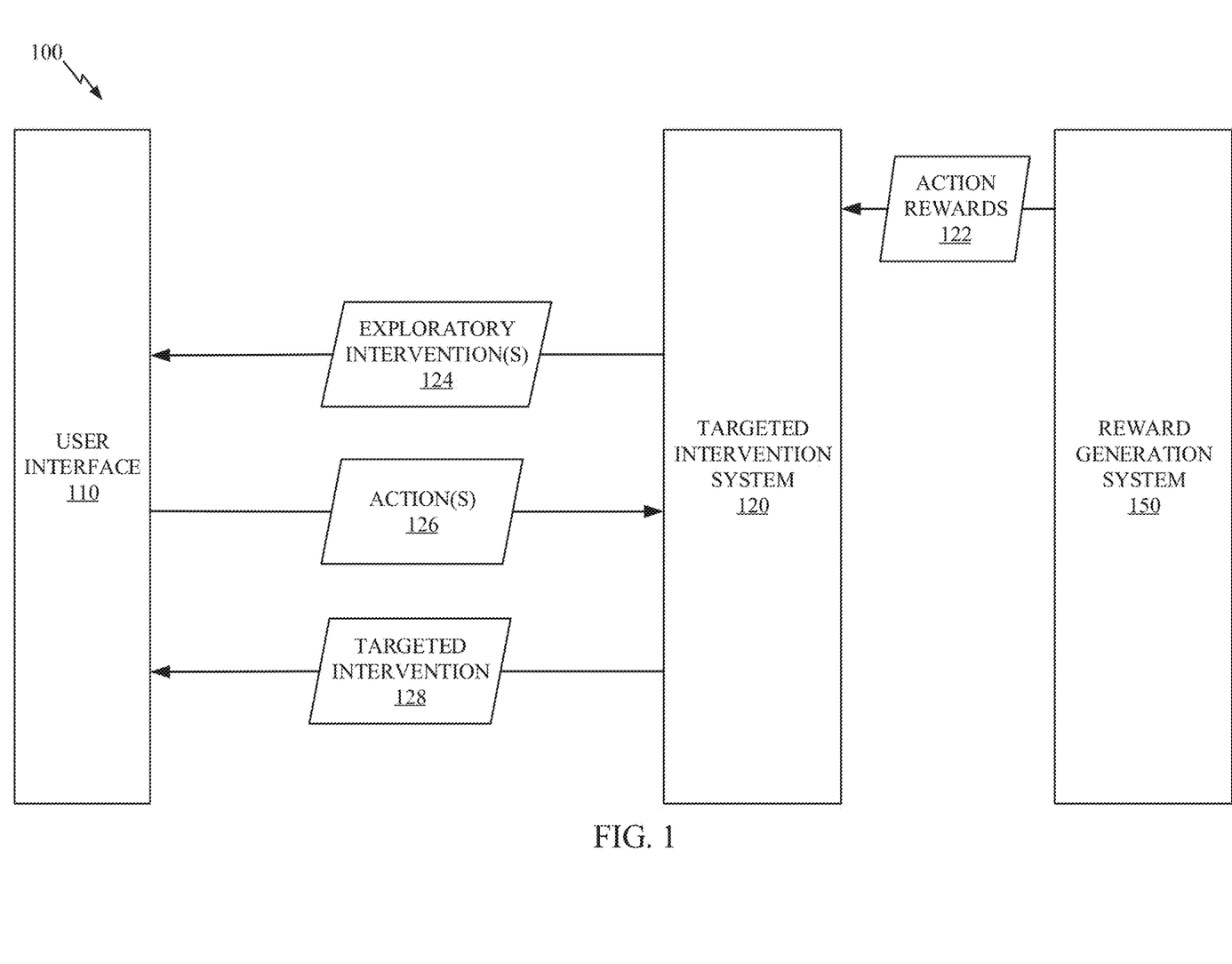
FIG. 1 is a diagram illustrating example computing components related to dynamic reward-driven intervention in a software application, according to certain embodiments.

Example Computing Components Related to Dynamic Reward-Driven Intervention in a Software Application FIG. 1 is a diagram 100 illustrating example computing components related to dynamic reward-driven intervention in a software application, according to certain embodiments.

In diagram 100, a reward generation system 150 generates action rewards 122 (e.g., for actions that can be performed by a user of the software application) based on data that indicates connections between interventions, actions, and target attribute values. Functionality of reward generation system 150 is described in more detail below with respect to FIG. 2, and may involve training a reward machine learning model based on data from a plurality of users indicating prior interventions provided to the users, prior actions performed by the users, and prior target attribute values for the users. For instance, reward generation system 150 may be a software component that trains a machine learning model such as a regression model.

The data used to train the reward model may include records of past application-related activity from multiple users. For example, a user may have been provided with an intervention and the user may have subsequently performed one or more actions within the software application (e.g., within a threshold amount of time after the intervention). A changed value for a target attribute such as revenue may have been subsequently determined (e.g., after the intervention and, in some cases, after the actions). Actions are generally intermediate actions that may be performed within the software application after an intervention has been provided and, in some cases, before a change is detected in a target attribute. Thus, learning associations between such actions and target attribute value changes in connection with particular interventions enables the use of rewards for the actions (e.g., action rewards 122) as proxies for rewards for the target attribute. Action rewards 122 may, for example, include weights for a variety of different actions that are learned through a machine learning model training process as described herein. A given action reward 122 may represent a reward that should be assigned to a particular action in a subsequent reward-based machine learning model training process (e.g., performed by targeted intervention system 120) when that particular action is performed after an intervention has been provided. In some aspects, action rewards 122 may be normalized values (e.g., between zero and one) representing the relative strength of association between each action and a corresponding change in a target attribute value (e.g., a corresponding increase in revenue) after an intervention has been provided. Thus, action rewards 122 may represent the likelihoods that individual actions, when performed after an intervention has been provided, will lead to a desired outcome in terms of a target attribute.

For example, action rewards 122 may be used by targeted intervention system 120 to train an intervention machine learning model to predict interventions that are likely to produce a desired outcome for a particular user without the need to capture training data that includes values for the target attribute for the particular user. Targeted intervention system 120 may gather training data for use in such a training process by providing one or more exploratory interventions 124 to a user via user interface 110 and then receiving indications of action(s) 126 performed by the user after each such intervention is provided.

Functionality of targeted intervention system 120 is described in more detail below with respect to FIG. 3. Targeted intervention system 120 may be a software component that trains a machine learning model, such as a regression model, based on exploratory intervention(s) 124, action(s) 126, and action rewards 122. User interface 110 generally represents a user interface associated with a software application, such as displaying content (e.g., including exploratory intervention(s) 124) and receiving input (e.g., including inputs that initiate action(s) 126). An example of such a user interface 110 is described below with respect to FIG. 4.

Targeted intervention system 120 may use a reward-based machine learning model training technique to train an intervention machine learning model (e.g., assigning action rewards 122 to action(s) 126 as appropriate) for the user. Once trained, the intervention machine learning model may be capable of predicting interventions that are likely to have a positive outcome in terms of the target attribute (e.g., because action(s) 126 and action rewards 122 serve as proxy training data for the target attribute for the user) for the user. Thus, targeted intervention system 120 may use the intervention machine learning model to select a targeted intervention 128 to provide to the user, and the targeted intervention 128 may be provided accordingly via user interface 110. For instance, targeted intervention 128 may include a suggested action, relevant content, an offer, an initiation of a support session, and/or the like.

Figure 2:
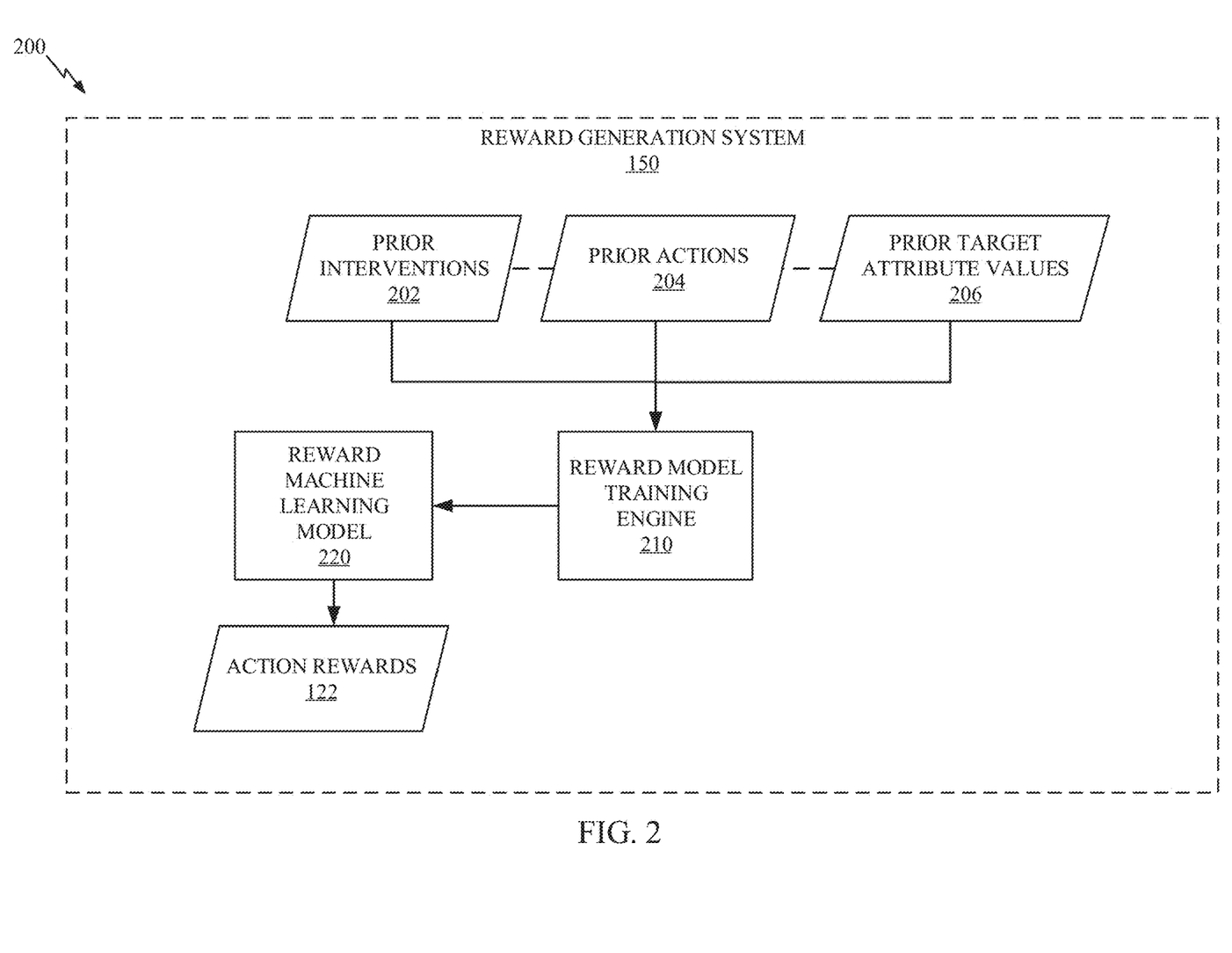
FIG. 2 is a diagram illustrating example functionality related to dynamic reward-driven intervention in a software application, according to certain embodiments.

FIG. 2 is a diagram 200 illustrating example functionality related to dynamic reward-driven intervention in a software application, according to certain embodiments. Diagram 200 includes reward generation system 150 and action rewards 122 of FIG. 1.

In diagram 200, reward generation system 150 makes use of prior interventions 202 and associated prior actions 204 and associated prior target attribute values 206 in a model training process performed by reward model training engine 210. Prior interventions 202, prior actions 204, and prior target attribute values 206 may represent data captured for a plurality of users over time, such as in connection with use of a software application.

Prior interventions 202 generally represent indications of interventions of various types that were provided to users. Examples of interventions include presenting content, initiating support sessions, suggesting actions to perform, providing communication or offers, and/or the like.

Prior actions 204 generally represent indications of actions that were performed by users in connection with prior interventions 202. For example, each prior action 204 may have been performed by a respective user after a prior intervention 202 was provided to the respective user (e.g., within a threshold amount of time after the prior intervention 202 was provided). Examples of actions include creation of a particular type of document (e.g., an invoice), assigning of a category to an item (e.g., categorizing a transaction within an accounting application), activation of an application feature (e.g., payroll management), navigation to a particular page within the software application (e.g., visiting a page that provides information about a particular product or service), and/or the like.

Prior target attribute values 206 generally represent indications of changes (e.g., increases in value) for one or more target attributes that occur in connection with prior interventions 202. For example, each prior target attribute value 206 may be a value for a target attribute that was detected for a respective user before and/or after the time that a respective prior intervention 202 was provided to a respective user. In one example, a prior target attribute value 206 indicates that a revenue total associated with a particular user (e.g., the total amount of revenue received from the particular user) increased by a given amount after a prior intervention 202 was provided to the particular user (e.g., within a threshold amount of time after the intervention was provided). In another example, a prior target attribute value 206 indicates that a user purchased a product or service after a prior intervention 202 was provided to the user (e.g., within a threshold amount of time after the intervention was provided). Examples of target attributes include revenue, purchase of a product or service, subscription(s), and/or the like.

Reward model training engine 210 may train reward machine learning model 220 based on prior interventions 202, prior actions 204, and prior target attribute values 206, such as using a supervised learning process. For example, a set of training data may be generated based on prior interventions 202, prior actions 204, and prior target attribute values 206. The training data may include, for each prior intervention 202, any prior actions 204 that occurred within a threshold amount of time (e.g., 45 days) after the prior intervention 202 was provided and any change in target attribute value indicated by prior target attribute values 206 that occurred within a threshold amount of time (e.g., 45 days) after the prior intervention 202 was provided.

For example, a set of actions A1, A2, . . . . Ai may represent types of actions that may have a direct or indirect impact on a target attribute. The metric for which reward machine learning model 220 is to be optimized may be determined as one of the target attributes reflected in prior target attribute values 206. The set of interventions that can be applied to users may be described as X1, X2, . . . . Xj. After each intervention Xk was given to a user, the lift in the target attribute may be measured using the equation Lift Xk=Rev45 after Xk-Rev45 before Xk, where Lift|Xk stands for the increase in the target attribute resulting from intervention Xk, Rev45 stands for the target attribute (e.g., in this case 45 day revenue), Rev45 before Xk stands for the target attribute value before providing intervention Xk, and Rev45 stands for the target attribute value after providing intervention Xk. The action(s) taken by the user within a threshold amount of time (e.g., 45 days) after each intervention may be represented by a1, a2, . . . ai, where ai corresponds to A1, a2 corresponds to A2, and so on, and where each an indicates whether action An was performed (e.g., as a binary value) and/or a number of counts of action An within that amount of time (e.g., as an integer).

The lift from each action, E(Lift|Xk)~ {Ai|Xk}, can be modeled using a regression method (e.g., which may be an example of training reward machine learning model 220), and the weight of each action determined through the modeling process may be used as the expected lift reward for that action (e.g., action rewards 122 may be the set of action weights). For example, E(Lift|Xk) may represent an estimation of Lift|Xk, which is determined by {Ai|Xk}, which represents the set of expected lift rewards for each action Ai with respect to action Xj.

Supervised learning generally involves providing training inputs as inputs to a machine learning model. The model processes the training inputs and produces outputs based on the training inputs. The outputs are compared to the labels associated with the training inputs to determine the accuracy of the model, and parameters of the model are iteratively adjusted until one or more conditions are met. For instance, the one or more conditions may relate to an objective function (e.g., a cost function or loss function) for optimizing one or more variables (e.g., relating to model accuracy). In some embodiments, the conditions may relate to whether the predictions produced by the model based on the training inputs match the labels associated with the training inputs or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used by nodes to calculate scores, and the like. In some embodiments, validation and testing are also performed for reward machine learning model 220, such as based on validation data and test data, as is known in the art.

Compared to using raw target attribute values (e.g., raw revenue metrics) for rewards, techniques described herein can significantly shorten the measurement time for training and reduce the variance of rewards. In the case of a complex software ecosystem, target attributes such as revenue have an extremely high variance, so converting the long-term reward to mid/short term reward without changing the optimized target provides significant advantages. For example, as described below with respect to FIG. 3, action rewards 122 may be used as rewards assigned to actions for training an intervention machine learning model based on training data for an individual user that includes action data but does not necessarily include values for the target attribute.

Figure 3:
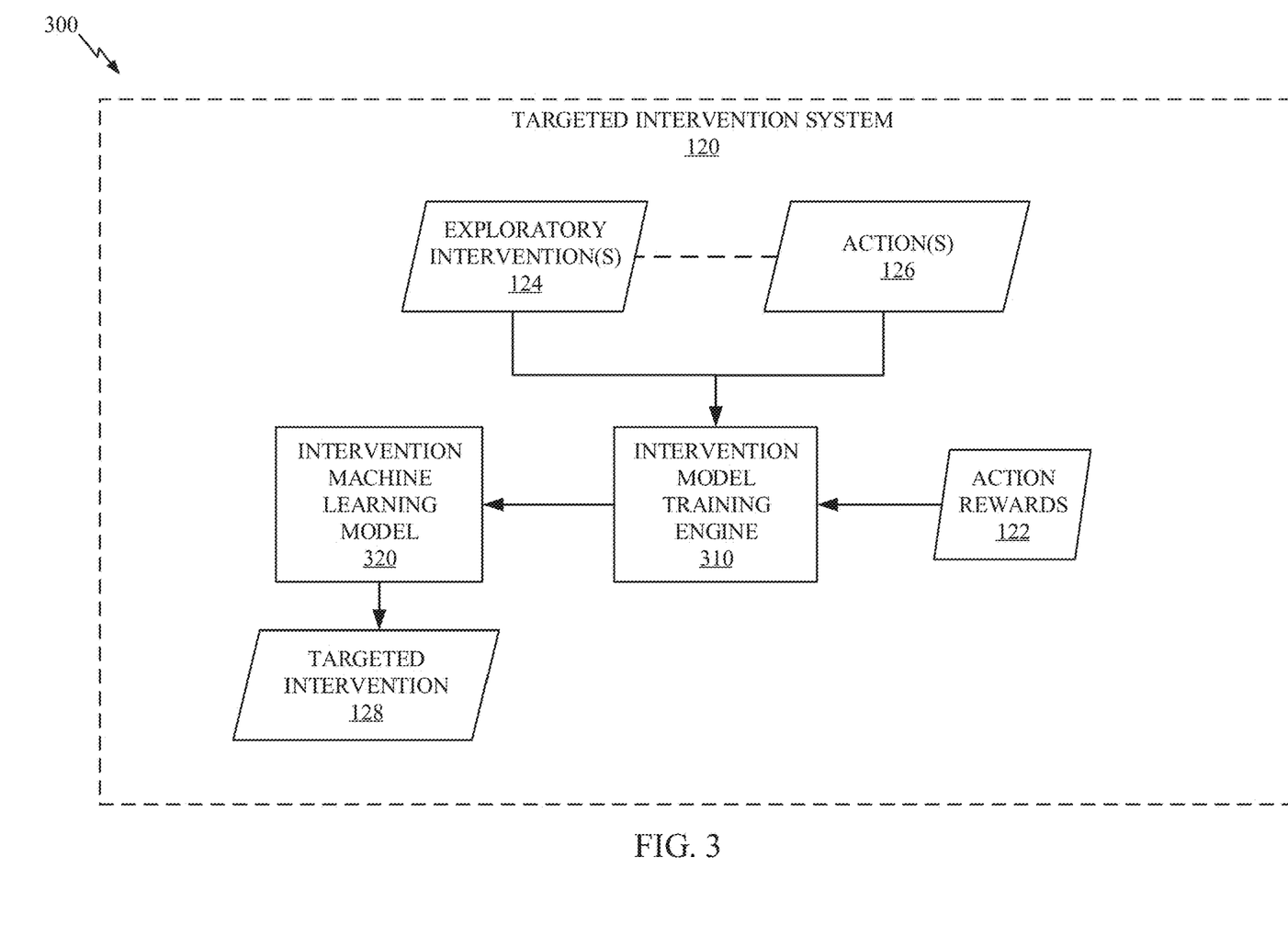
FIG. 3 is a diagram illustrating example functionality related to dynamic reward-driven intervention in a software application, according to certain embodiments.

FIG. 3 is a diagram 300 of example functionality related to dynamic reward-driven intervention in a software application, according to certain embodiments. Diagram 300 includes targeted intervention system 120, exploratory intervention(s) 124, action(s) 126, action rewards 122, and targeted intervention 128 of FIG. 1.

Exploratory intervention(s) 124 generally represent interventions that are provided to a user as part of a process for obtaining training data for the user, and action(s) 126 generally represent actions that are performed by the user within a threshold amount of time after each of exploratory intervention(s) 124 is provided. Targeted intervention system 120 may train intervention machine learning model 320, at intervention model training ending 310, using exploratory intervention(s) 123, action(s) 126, and action rewards 122, such as using a supervised learning process. For example, action rewards 122 may be used to assign rewards to action(s) 126 in a reward-based machine learning model training process in order to determine how likely each intervention represented in exploratory intervention(s) 124 is to produce a desired outcome for the user, with action rewards being assigned to action(s) 126 for use as a proxy for the desired outcome (e.g., the desired outcome may be a lift in a target attribute). Intervention model training engine 310 may train intervention machine learning model 320 to predict which intervention(s) are most likely to have a positive outcome (e.g., in terms of action rewards) for the user. For instance, intervention model training engine 310 may involve regression techniques, reinforcement learning techniques, and/or other supervised learning techniques that incorporate rewards.

Once trained, intervention machine learning model 320 may be used to determine targeted intervention 128 to provide to the user. For example, targeted intervention 128 may be an intervention that is determined by intervention machine learning model 320 to result in a high reward value (e.g., above a threshold) for the user. Targeted intervention 128 may be provided to the user, such as via a user interface, through a message or other form of output, and/or the like.

Figure 4:
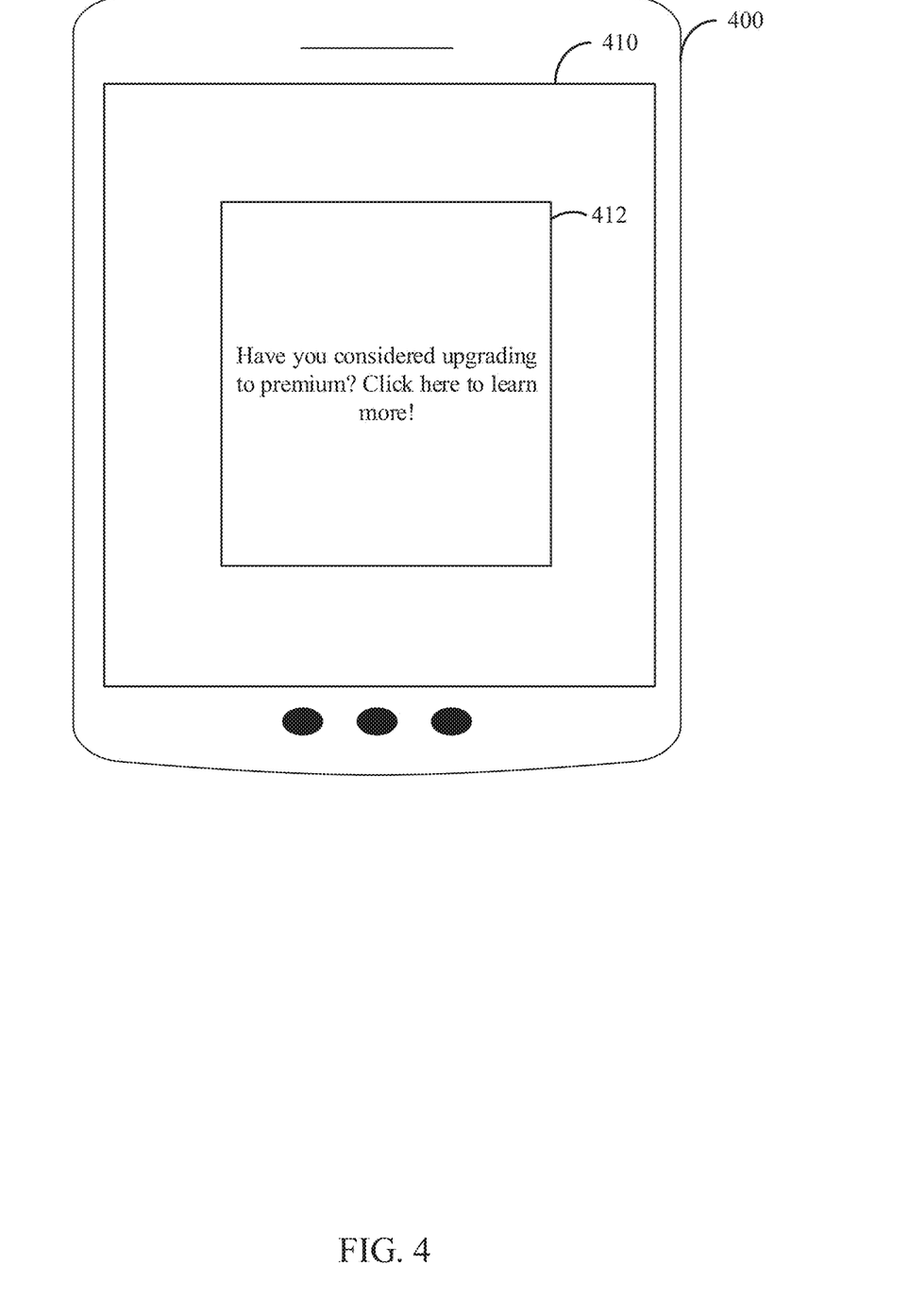
FIG. 4 depicts an example user interface screen related to dynamic reward-driven intervention in a software application, according to certain embodiments.

Example User Interface Screen Related to Dynamic Reward Driven Intervention in a Software Application FIG. 4 depicts an example user interface screen 410 on a computing device 400 related to dynamic reward driven intervention in a software application, according to certain embodiments. For example, user interface screen 410 may be an example screen of user interface 110 of FIG. 1.

Device 400 may be representative of a computing device such as system 600 of FIG. 6 (described below) on which one or more software applications may be executed. In some embodiments, aspects of functionality described herein may be performed on device 400, while other aspects of functionality described herein may be performed on one or more separate computing devices, such as one or more servers connected to device 400 via a network (e.g., the Internet or another connection over which data may be transmitted). In one example, device 400 is a mobile device such as a smartphone.

User interface screen 410 includes a message 412 that recommends an action (e.g., upgrading to a premium version of a software application or other product or service) and includes a link that, when selected, initiates a process for performing the recommended action (e.g., the recommended upgrade). Message 412 may be an example of an intervention that may be provided according to techniques described herein. For example, message 412 may be an example of a prior intervention 202 of FIG. 2, an exploratory intervention 124 of FIG. 1 or 3, or a targeted intervention 128 of FIG. 1 or 3.

It is noted that the intervention described with respect to user interface screen 410 is included as an example, and many other examples are possible with techniques described herein.

Figure 5:
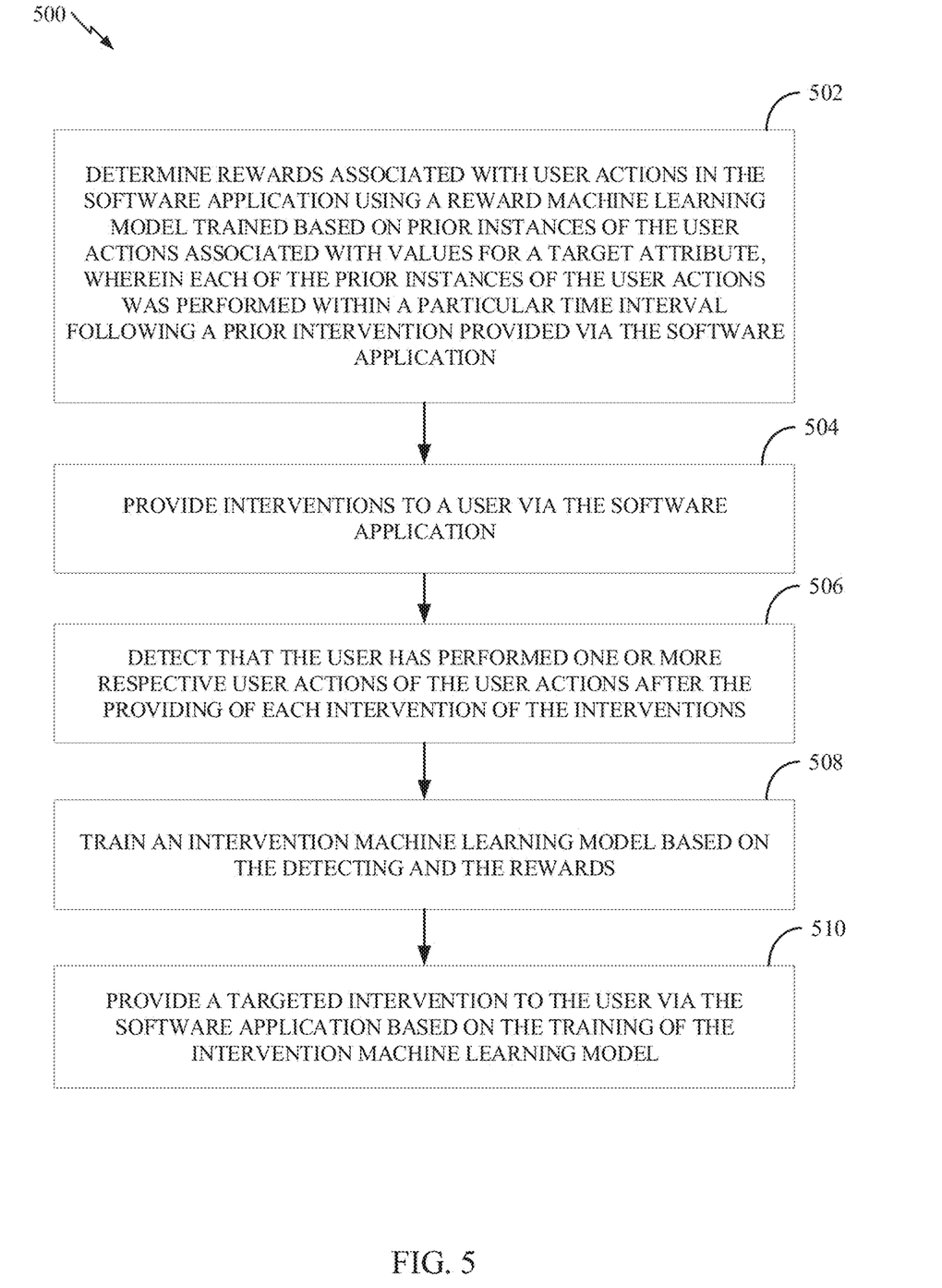
FIG. 5 depicts example operations related to dynamic reward-driven intervention in a software application, according to certain embodiments.

Examples Operations for Dynamic Reward Driven Intervention in a Software Application FIG. 5 depicts example operations 500 related to dynamic reward-driven intervention in a software application, according to certain embodiments. For example, illustration 500 may be performed by one or more components described above with respect to FIGS. 1-3 (e.g., reward generation system 150 and/or targeted intervention system 120 of FIG. 1), system 600 of FIG. 6 (described below), and/or one or more other components and/or devices.

Operations 500 begin at step 502, with determining rewards associated with user actions in the software application using a reward machine learning model trained based on prior instances of the user actions associated with values for a target attribute, wherein each of the prior instances of the user actions was performed within a particular time interval following a prior intervention provided via the software application.

In some embodiments, the determining of the rewards is based on modeling, by training the reward machine learning model, post-intervention lift amounts for the target attribute in connection with the user actions as indicated by the values.

Some embodiments further comprise determining the values for the target attribute by evaluating one or more of a revenue metric or a record of a purchase, enrollment, or upgrade.

In some embodiments, the reward machine learning model was trained through a supervised regression learning algorithm based on the prior instances of the user actions associated with the values for the target attribute.

Operations 500 continue at step 504, with providing interventions to a user via the software application.

Operations 500 continue at step 506, with detecting that the user has performed one or more respective user actions of the user actions after the providing of each intervention of the interventions.

In certain embodiments, the detecting that the user has performed the one or more respective user actions of the user actions after the providing of each intervention of the interventions comprises detecting one or more of creation of a particular type of document, assigning of a category to an item, activation of an application feature, or navigation to a particular page within the software application.

Operations 500 continue at step 508, with training an intervention machine learning model based on the detecting and the rewards.

In some embodiments, the training of the intervention machine learning model based on the detecting and the rewards comprises training the intervention machine learning model to predict interventions that are likely to be followed by one or more particular actions of the one or more respective user actions for the user based on one or more respective rewards of the rewards that correspond to the one or more particular actions.

Operations 500 continue at step 510, with providing a targeted intervention to the user via the software application based on the training of the intervention machine learning model.

In certain embodiments, the providing of the targeted intervention to the user via the software application is based on using the intervention machine learning model, after the training, to determine that the targeted intervention is likely to be followed by the one or more particular actions.

In some embodiments, the providing of the targeted intervention to the user via the software application comprises one or more of displaying targeted content via a user interface associated with the software application or initiating a support session with the user.

Notably, method 500 is just one example with a selection of example steps, but additional methods with more, fewer, and/or different steps are possible based on the disclosure herein.

Example Computing System

Figure 6:
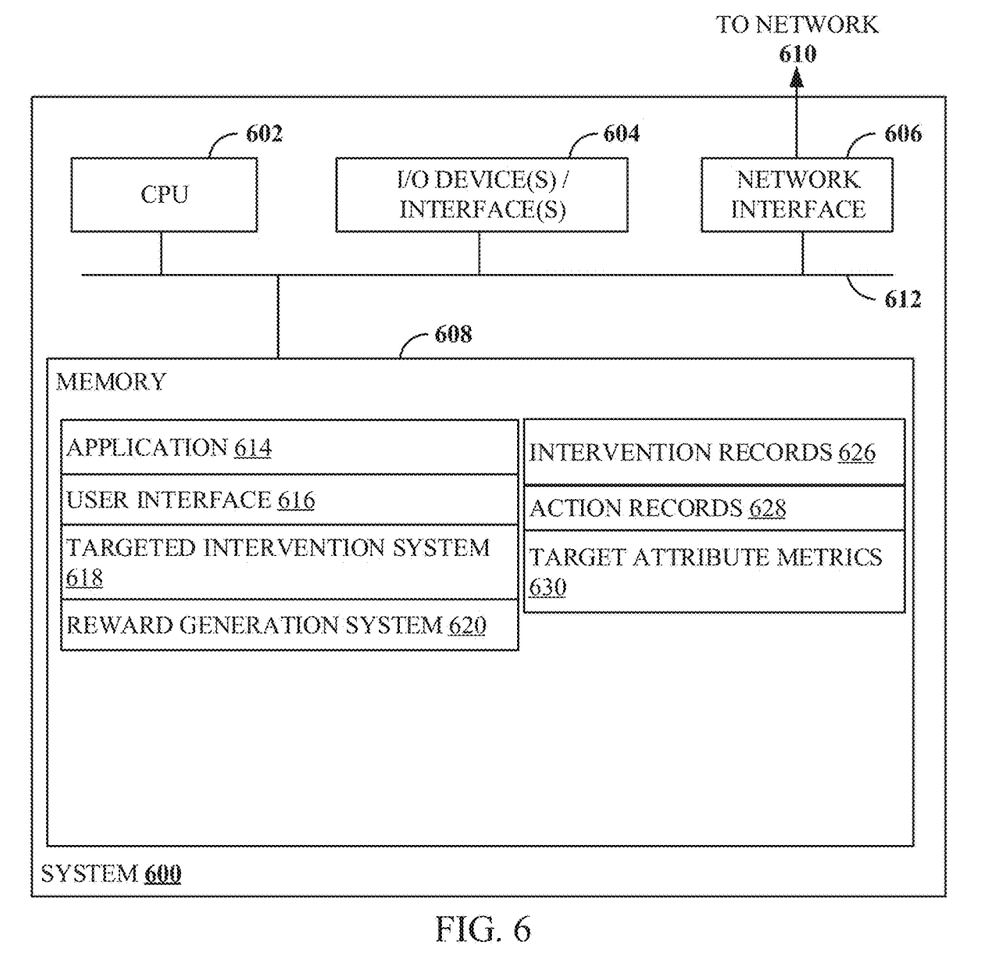
FIG. 6 depicts an example processing system for dynamic reward-driven intervention in a software application, according to certain embodiments.

FIG. 6 illustrates an example computing system 600 with which embodiments of the disclosure related to dynamic reward-driven intervention in a software application may be implemented. For example, the computing system 600 may be representative of device 400 of FIG. 4, may perform aspects of functionality described above with respect to FIGS. 1-3, and/or may perform operations 500 of FIG. 5.

The computing system 600 includes a central processing unit (CPU) 602, one or more I/O device interfaces 604 that may allow for the connection of various I/O devices 604 (e.g., keyboards, displays, mouse devices, pen input, etc.) to the computing system 600, a network interface 606, a memory 608, and an interconnect 612. It is contemplated that one or more components of the computing system 600 may be located remotely and accessed via a network 610. It is further contemplated that one or more components of the computing system 600 may include physical components or virtualized components.

The CPU 602 may retrieve and execute programming instructions stored in the memory 608. Similarly, the CPU 602 may retrieve and store application data residing in the memory 608. The interconnect 612 transmits programming instructions and application data, among the CPU 602, the I/O device interface 604, the network interface 606, the memory 608. The CPU 602 is included to be representative of a single CPU, multiple CPUs, a single CPU having multiple processing cores, and other arrangements.

Additionally, the memory 608 is included to be representative of a random access memory or the like. In some embodiments, the memory 608 may include a disk drive, solid state drive, or a collection of storage devices distributed across multiple storage systems. Although shown as a single unit, the memory 608 may be a combination of fixed and/or removable storage devices, such as fixed disc drives, removable memory cards or optical storage, network attached storage (NAS), or a storage area-network (SAN).

As shown, the memory 608 includes application 614, which may be representative of a software application that provides functionality described herein related to dynamic reward-driven intervention (e.g., interventions described herein may be provided within application 614). Memory 608 further includes user interface 616, targeted intervention system 618, and reward generation system 620, which may be representative of user interface 110, targeted intervention system 120, and reward generation system 150 of FIG. 1. While not shown, targeted intervention system 618 and reward generation system 620 may include and/or may utilize one or more machine learning models as described herein Memory 608 further includes intervention records 626, which may include prior interventions 202 of FIG. 2 and/or exploratory interventions 124 of FIG. 1. Memory 608 further includes action records 628, which may include prior actions 204 of FIG. 2 and/or action(s) 126 of FIG. 1. Memory 608 further includes target attribute metrics 630, which may include prior target attribute values 206 of FIG. 2.

It is noted that system 600 is included as an example, and certain functionality described with respect to system 600 and/or otherwise described herein may be implemented via more or fewer devices and/or components.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for dynamic reward-driven intervention in a software application, comprising:
    determining rewards associated with user actions in the software application using a reward machine learning model trained based on prior instances of the user actions associated with values for a target attribute, wherein each of the prior instances of the user actions was performed within a particular time interval following a prior intervention provided via the software application, and wherein the determining of the rewards is based on determining, for each respective user action of the user actions, an expected post-intervention lift amount in the target attribute;
    providing interventions to a user via the software application;
    detecting that the user has performed one or more respective user actions of the user actions after the providing of each intervention of the interventions;
    training an intervention machine learning model based on the detecting and the rewards, wherein the training of the intervention machine learning model comprises assigning, to each user action of the one or more respective user actions, a reward of the rewards that corresponds to the user action; and
    providing a targeted intervention to the user via the software application based on the training of the intervention machine learning model.

2. The method of claim 1, wherein the determining of the rewards is based on modeling, by training the reward machine learning model, post-intervention lift amounts for the target attribute in connection with the user actions as indicated by the values.

3. The method of claim 1, wherein the training of the intervention machine learning model based on the detecting and the rewards comprises training the intervention machine learning model to predict interventions that are likely to be followed by one or more particular actions of the one or more respective user actions for the user based on one or more respective rewards of the rewards that correspond to the one or more particular actions.

4. The method of claim 1, wherein the providing of the targeted intervention to the user via the software application comprises one or more of:
    displaying targeted content via a user interface associated with the software application; or
    initiating a support session with the user.

5. The method of claim 1, wherein the detecting that the user has performed the one or more respective user actions of the user actions after the providing of each intervention of the interventions comprises detecting one or more of:
    creation of a particular type of document;
    assigning of a category to an item;
    activation of an application feature; or
    navigation to a particular page within the software application.

6. The method of claim 1, wherein the reward machine learning model was trained through a supervised regression learning algorithm based on the prior instances of the user actions associated with the values for the target attribute.

7. The method of claim 3, wherein the providing of the targeted intervention to the user via the software application is based on using the intervention machine learning model, after the training, to determine that the targeted intervention is likely to be followed by the one or more particular actions.

8. The method of claim 5, further comprising determining the values for the target attribute by evaluating one or more of:

a revenue metric; or a record of a purchase, enrollment, or upgrade.

9. A system for dynamic reward-driven intervention in a software application, comprising:
one or more processors; and
a memory comprising instructions that, when executed by the one or more processors, cause the system to:
determine rewards associated with user actions in the software application using a reward machine learning model trained based on prior instances of the user actions associated with values for a target attribute, wherein each of the prior instances of the user actions was performed within a particular time interval following a prior intervention provided via the software application, and wherein the determining of the rewards is based on determining, for each respective user action of the user actions, an expected post-intervention lift amount in the target attribute;
provide interventions to a user via the software application;
detect that the user has performed one or more respective user actions of the user actions after the providing of each intervention of the interventions;
train an intervention machine learning model based on the detecting and the rewards, wherein the training of the intervention machine learning model comprises assigning, to each user action of the one or more respective user actions, a reward of the rewards that corresponds to the user action; and
provide a targeted intervention to the user via the software application based on the training of the intervention machine learning model.

10. The system of claim 9, wherein the determining of the rewards is based on modeling, by training the reward machine learning model, post-intervention lift amounts for the target attribute in connection with the user actions as indicated by the values.

11. The system of claim 9, wherein the training of the intervention machine learning model based on the detecting and the rewards comprises training the intervention machine learning model to predict interventions that are likely to be followed by one or more particular actions of the one or more respective user actions for the user based on one or more respective rewards of the rewards that correspond to the one or more particular actions.

12. The system of claim 9, wherein the providing of the targeted intervention to the user via the software application comprises one or more of:
displaying targeted content via a user interface associated with the software application; or
initiating a support session with the user.

13. The system of claim 9, wherein the detecting that the user has performed the one or more respective user actions of the user actions after the providing of each intervention of the interventions comprises detecting one or more of:
creation of a particular type of document;
assigning of a category to an item;
activation of an application feature; or
navigation to a particular page within the software application.

14. The system of claim 9, wherein the reward machine learning model was trained through a supervised regression learning algorithm based on the prior instances of the user actions associated with the values for the target attribute.

15. The system of claim 11, wherein the providing of the targeted intervention to the user via the software application is based on using the intervention machine learning model, after the training, to determine that the targeted intervention is likely to be followed by the one or more particular actions.

16. The system of claim 13, wherein the instructions, when executed by the one or more processors, further cause the system to determine the values for the target attribute by evaluating one or more of:
a revenue metric; or
a record of a purchase, enrollment, or upgrade.

17. A non-transitory computer readable medium comprising instructions that, when executed by one or more processors of a computing system, cause the computing system to:
determine rewards associated with user actions in a software application using a reward machine learning model trained based on prior instances of the user actions associated with values for a target attribute, wherein each of the prior instances of the user actions was performed within a particular time interval following a prior intervention provided via the software application, and wherein the determining of the rewards is based on determining, for each respective user action of the user actions, an expected post-intervention lift amount in the target attribute;
provide interventions to a user via the software application;
detect that the user has performed one or more respective user actions of the user actions after the providing of each intervention of the interventions;
train an intervention machine learning model based on the detecting and the rewards, wherein the training of the intervention machine learning model comprises assigning, to each user action of the one or more respective user actions, a reward of the rewards that corresponds to the user action; and
provide a targeted intervention to the user via the software application based on the training of the intervention machine learning model.

18. The non-transitory computer readable medium of claim 17, wherein the determining of the rewards is based on modeling, by training the reward machine learning model, post-intervention lift amounts for the target attribute in connection with the user actions as indicated by the values.

19. The non-transitory computer readable medium of claim 17, wherein the training of the intervention machine learning model based on the detecting and the rewards comprises training the intervention machine learning model to predict interventions that are likely to be followed by one or more particular actions of the one or more respective user actions for the user based on one or more respective rewards of the rewards that correspond to the one or more particular actions.

20. The non-transitory computer readable medium of claim 19, wherein the providing of the targeted intervention to the user via the software application is based on using the intervention machine learning model, after the training, to determine that the targeted intervention is likely to be followed by the one or more particular actions.

* * * * *